April 27, 1943. H. I. LEWIS 2,317,784
TIMBER CART
Filed Oct. 20, 1941 2 Sheets-Sheet 1
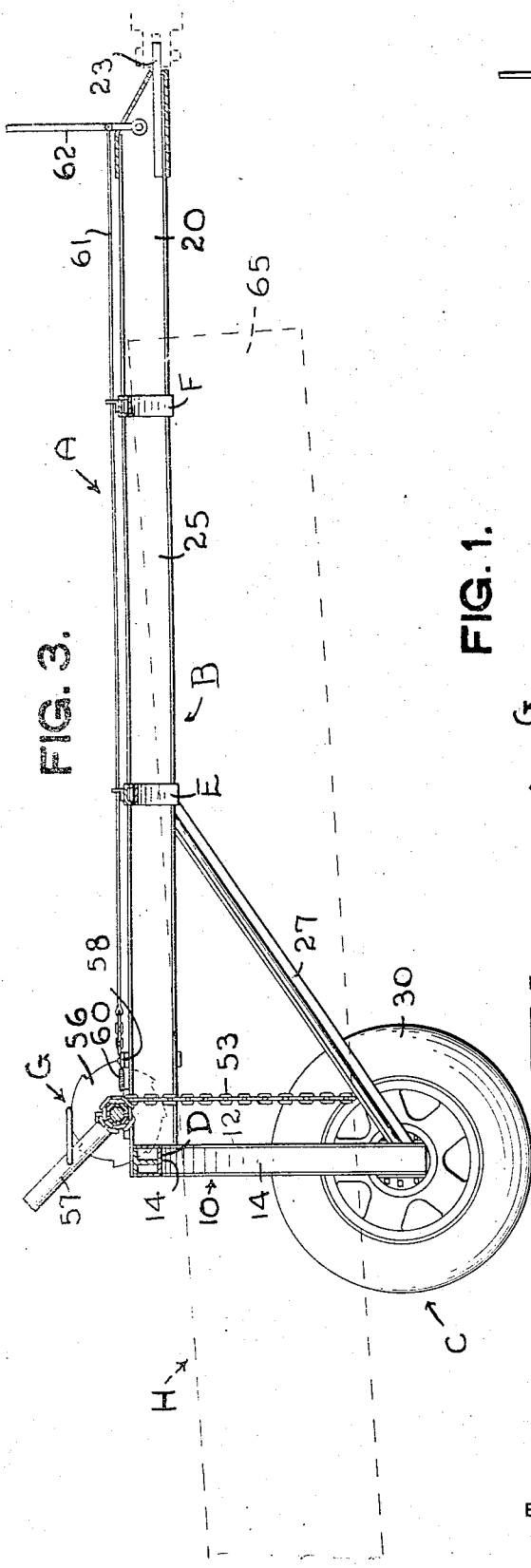
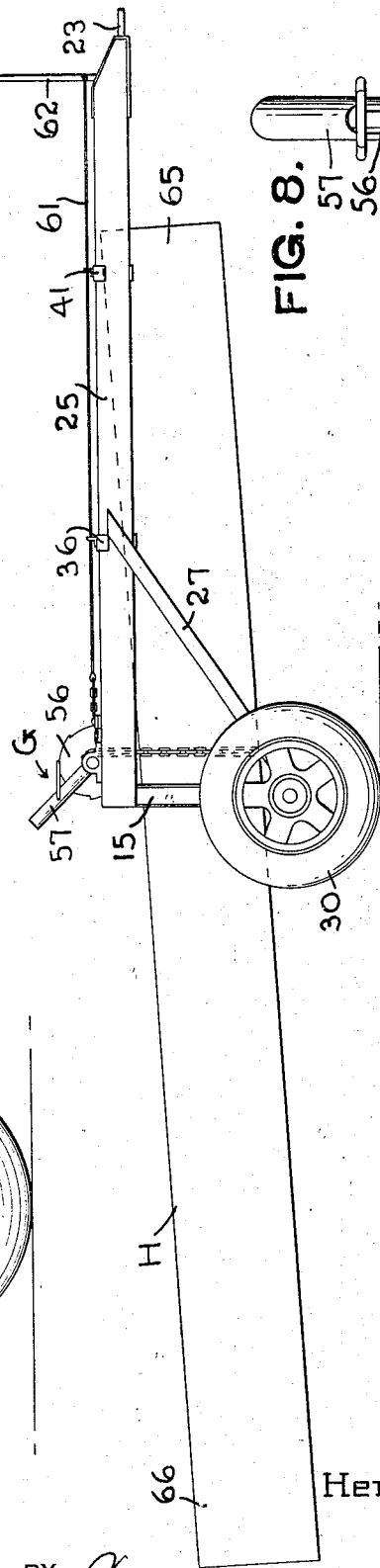
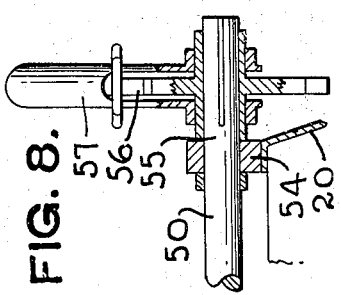
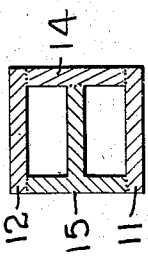
INVENTOR.
Herbert I. Lewis
BY
ATTORNEYS.

April 27, 1943.  H. I. LEWIS  2,317,784
TIMBER CART
Filed Oct. 20, 1941  2 Sheets-Sheet 2
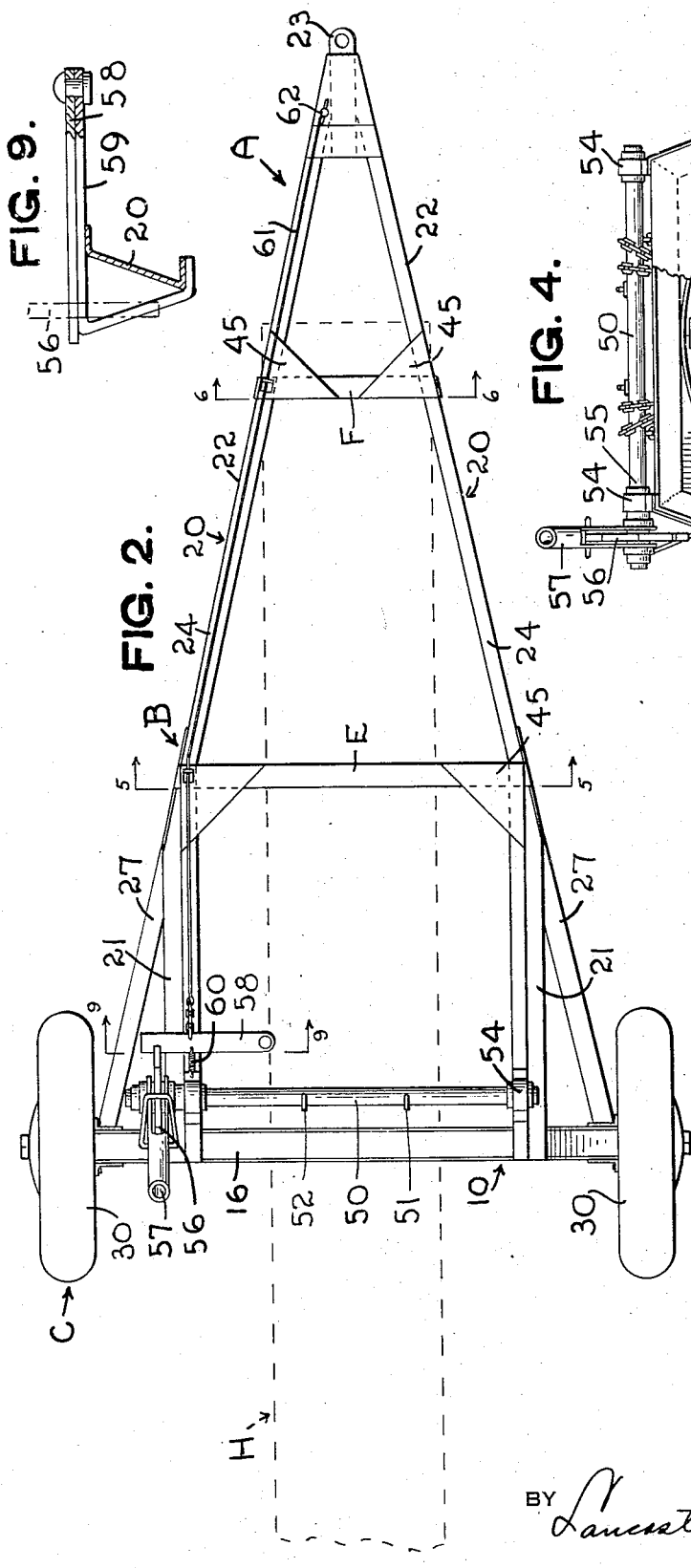
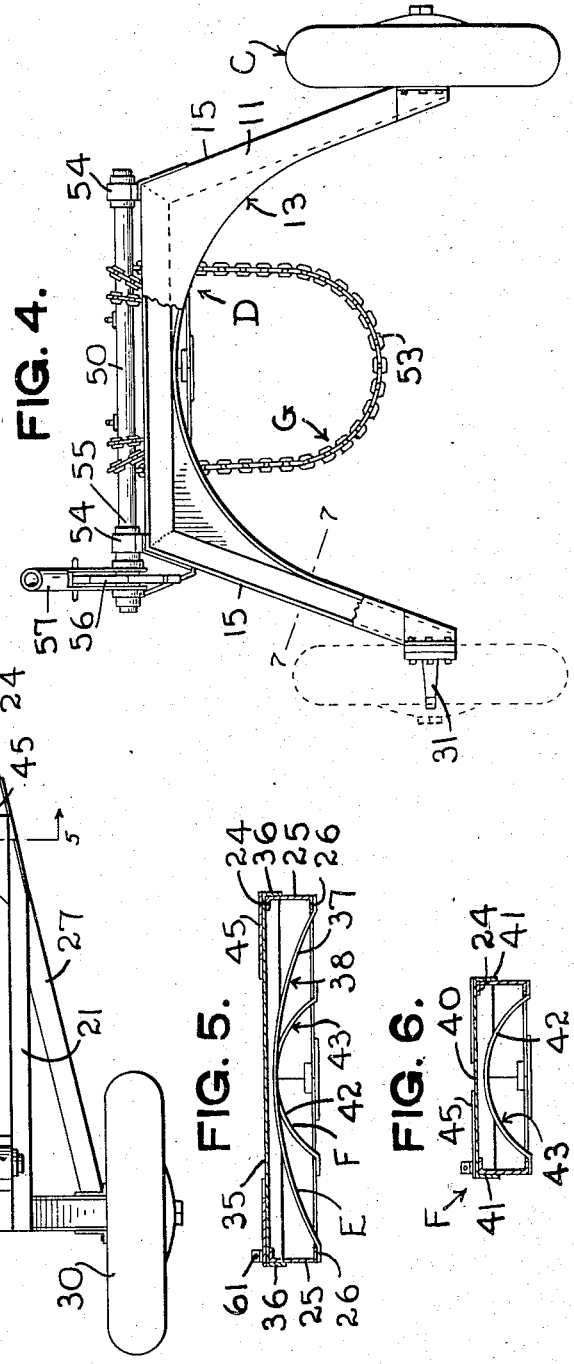
INVENTOR.
Herbert I. Lewis
BY Lancaster, Allwine & Rommel
ATTORNEYS.

Patented Apr. 27, 1943

2,317,784

UNITED STATES PATENT OFFICE 2,317,784

TIMBER CART

Herbert I. Lewis, Wrens, Ga.

Application October 20, 1941, Serial No. 415,795

7 Claims. (Cl. 214—65.3)

The present invention relates to carts or trailers for timber, such as logs, piles, lumber, etc., and one of the main objects of the invention is to provide such a vehicle whereby heavy loads of timber may be easily lifted, transported from place to place, and lowered at their destination and which, while being transported, are unlikely to be damaged. This is in contradistinction to logging vehicles which are relatively short in length and contemplate dragging the logs or timber over the roads or ground surface.

Another object of the invention is to provide timber carts which are comparatively light in weight and inexpensive to manufacture by incorporating in the chassis rolled metal sections similar to those used in the production of automobile bodies which may be welded together to make the chassis strong and sturdy yet capable of repair in the event parts become damaged.

A further object of the invention is to provide carts which are capable of transporting timber of various lengths, there being provided a plurality of arches extending transversely of the chassis, against which the timber may engage, at the underside of the selected arch, when the timber is hoisted so as to have the center of gravity of the mass of timber, to the rear of the hoist and the arches forwardly of the hoist. By this construction and arrangement of parts the rear end of the load may be lifted clear of the surface over which the load is transported, so that bark on logs, coatings on piles or finished lumber will not be damaged by contact with the road surface and the arches will tend to center the load in the vertical longitudinal plane of the cart.

Other objects and advantages of the invention will appear in the following detailed description of the preferred embodiment of the invention, taken in connection with the accompanying drawings forming a part of this specification, and in which drawings:

Figure 1 is a side elevation of the novel timber cart illustrating how it may support a timber, free of the surface upon which the cart is standing.

Figure 2 is a top plan view of the cart.

Figure 3 is a vertical longitudinal section, illustrating in dotted lines a timber in an elevated position.

Figure 4 is a rear elevation of the novel timber cart, with portions in section so as to better illustrate portions of the construction.

Figure 5 is a section substantially upon the line 5—5 of Fig. 2.

Figure 6 is a section substantially upon the line 6—6 of Fig. 2.

Figure 7 is a section substantially upon the line 7—7 of Fig. 4.

Figure 8 is a vertical sectional view of a portion of the hoisting means.

Figure 9 is a section substantially upon the line 9—9 of Fig. 2.

In the drawings, wherein for the purpose of illustration, is shown a preferred embodiment of the invention and wherein similar reference characters designate corresponding parts throughout the several views, the letter A may designate generally the novel timber cart or hauler; the letter B, the chassis thereof; C, the running gear; D, E and F, abutment means for the timber being hauled; G, the elevating or hoisting means for the timber; and H, the timber itself.

The chassis B preferably includes an end or rear portion 10, somewhat of a high-arch type, but built radically differently and functioning in a manner dissimilar to conventional high-arch portions of timber carts.

This end portion 10 includes a pair of aligned and spaced apart vertical side walls 11 and 12, each substantially defining a vertical section of a truncated cone, with a portion of the material (which may be sheet iron) cut out to provide a downwardly facing arc 13, as is clearly shown in Fig. 4.

A curved wall 14, which may be of band iron, joins the side walls 11 and 12, at the arc 13, and is preferably welded thereto with the wall 14, flush with the arc 13.

End walls 15 and a top wall 16 for the side walls 11 and 12 are provided. These walls 15 and 16 preferably comprise sections of T-irons, disposed as shown in Figures 3 and 7, and with their webs welded together and the walls 15 and 16, welded to the walls 11 and 12. Thus is provided a very strong construction of the portion of the vehicle which must bear the entire weight of the vehicle and its load.

The chassis B also includes a pair of tongues 20, secured to the rear portion 10, preferably of channel iron construction. The tongues 20 may project from the rear portion 10 for a portion of their length in substantially paralleling relation, as at 21 and then converge as at 22 where, at their free ends, they may be suitably connected with a conventional hitch or handle 23. Thus there are provided upper faces 24, outermost faces 25 and lower faces 26 for each tongue 20.

A pair of braces 27, may extend upwardly, one from the lower part of each end portion 10, in converging relation to the tongues 20. These braces 27 may comprise angle irons with a section of pipe extending longitudinally thereof, as a reinforcing. The pipe, angle irons and wall 11 may be suitably welded at their connecting portions.

Running gear C may comprise a pair of wheels 30, rotatably attached to spindles 31 which, in turn, are suitably secured to the lowermost part of the end portion 10 such as is clearly shown in Fig. 4.

The novel abutments D, E and F are provided to be engaged by portions of the timber H. Abutment D is, of course, the curved wall 14 of the end portion 10, while the abutment E is spaced from the abutments D and F, along the tongues 20, as shown in Fig. 2, and includes a section 35 of channel iron, bridging the tongues 20, with end portions 36 of the mid section of the channel iron 35 disposed upon the upper faces 24 and turned down over the outermost faces 25 of the tongues 20, where they may be secured in any approved way. An arcuate section 37 of band iron, or the like, is suitably secured to the lowermost face 26 of each tongue 10 and bridges the tongues, being disposed underneath the channel iron 35 and with the curve 38 upwardly concave.

Abutment F shown particularly in Fig. 6 is substantially similar to abutment E, but smaller since it is disposed nearer the converging ends of the tongues 20 than is the abutment E. There is, preferably a section 40 of channel iron, with end portions 41 thereof disposed as heretofore described for the portions 36 and an arcuate section 42 disposed as is the section 37 and with its curve 43 upwardly concave.

Braces 45, may reinforce the sections 35 and 40 of channel irons, as is well known in the art. From Fig. 5, where both abutments E and F are shown, it will be noted that the arcuate portion abutment F is of greater arc than the similar portion of abutment E, and that the horizontal plane of the uppermost section of the arcuate portion of abutment F substantially intersects the similar plane of the other abutment F.

The elevating or hoisting means G may be carried by the tongues 20 between the abutments D and E, and include a shaft or drum 50, with the ends 51 and 52 of a chain 53 secured to the drum 50 in any approved way at substantially an equal distance from the mid section thereof and with the chain 53 hanging downwardly in a loop, as shown in Fig. 4. This drum 50 may be suitably rotatably carried by bearings 54 mounted upon the tongues 20, and to one end 55 of the drum 50 may be secured, in any approved way, a ratchet wheel 56, having an actuator 57. A pawl 58, for the ratchet may be pivoted as shown in Fig. 9 to an arm 59, suitably secured to a tongue 20. The pawl may have the conventional contraction spring 60 and there may be provided a manual release for the pawl 58, comprising, in the example shown, a flexible line 61 attached at one end to the pawl 58 and extending to adjacent the hitch or handle 23, where the line 61 may be secured to an actuator 62.

Shown by way of example as a timber H is a log, but which may comprise logs, piles, cut lumber or the like. In this example the timber has a forward end portion 65 and a rearward end portion 66.

In use, the cart A is positioned over the timber H, which may be laying on the ground in a position where, with respect to the chain 53, the center of gravity of the mass will be to the rear of the chain 53. Now, when the chain 53 is looped under the timber H and the hoist means G actuated in one direction, the timber H will be lifted, with one end (the rearward end portion 66) of the timber still on the ground, until the forward end portion 65 abuts either the abutment E or F. Thereafter, continued actuation of the hoist means G will cause the rearward end portion 66 of the timber H to rise from the ground until it may take the position shown in dotted lines in Fig. 3, where it is engaged by all three of the abutments D, E and F and is held in a position where it will not sway. This is in contradistinction to timber carts and the like where the load is not lifted wholly free of the ground and is not supported against side sway.

Of course, abutments D and E may be employed where the timber is relatively short in length.

When the load has reached a position for its discharge, actuation of the hoist means G in the proper direction will first lower the rearward end portion 66 to the ground and then deposit the rest of the load gradually.

Positioning the actuating means of the hoisting means G to one side of the cart, makes it easy to manipulate the same and because this is near the abutment E (the last one to receive the load) the operator will be able to ascertain with certainty when the load is properly lifted.

The abutments E and F function both as abutments or inverted cradles for the load, but they also provide braces for the tongues 20, and the novel construction of the end portion 10 provides an abutment of particularly sturdy construction since it bears the weight of the chassis and load.

Various changes may be made in the shape, size and arrangement of parts without departing from the spirit of the invention or the scope of the following claims.

I claim:

1. In a timber hauler, a chassis, means for engaging the upper face of an end portion of a timber being hoisted to, transported by and lowered from said hauler, including an abutment for said upper face, rigid with said chassis, disposed well forwardly thereof, and combined hoisting and lowering means for said timber disposed well rearwardly of said first means and carried by said chassis, the length of said chassis being such that when said upper face of said end portion of said timber is engaged by said abutment and said hoist is raised, said timber will be wholly free of the surface over which said hauler travels.

2. In a high-arch timber trailer, a chassis, including a high-arched rear portion and a pair of tongues converging forwardly from said rear portion, running gear carried by said rear portion, a combined means for steadying a timber carried by said trailer and for bracing said tongues, comprising an abutment for said timber, bridging said tongues and carried forwardly by said chassis, and hoisting means carried by said chassis rearwardly of said combined means.

3. In a high-arch timber trailer a chassis including a high-arched rear section and a pair of tongues converging forwardly from and secured to said rear section, a pair of spaced-apart log abutments bridging said tongues and disposed transversely thereof, the rearward abutment including a downwardly-facing arcuate portion and the forward abutment including a downwardly-facing arcuate portion of greater arc than said first portion, the horizontal plane of the uppermost section of one of said portions substantially intersecting the horizontal plane of the other portion, and means carried by said chassis for raising and lowering a timber into abutment with either of said arches, with the center of gravity of said timber to the rear of said means.

4. In a high-arched logging cart, a high-arched chassis portion, provided with spaced-apart vertical side walls, each wall having a part of its material cut away, defining a downwardly-facing arc, a curved wall joining said side walls at said arc, and T-iron upper and end walls joining said side walls; a tongue extending from said arcuate portion and secured to one of said walls; means carried by said tongue to hoist a log toward said arc into contact with the arcuate portions of said walls; and wheels rotatably carried by said chassis portion.

5. In a high-arched logging cart, a high-arched chassis portion, provided with spaced-apart vertical side walls, each wall having a part of its material cut away, defining a downwardly-facing arc, a curved wall joining said side walls at said arc, and T-iron upper and end walls joining said side walls; a tongue extending from said arcuate portion and secured to one of said walls; means carried by said tongue to hoist a log toward said arc into contact with the arcuate portions of said walls; wheels, and means rotatably securing said wheels to said high-arch chassis portion adjacent the lower ends of said portion.

6. In a high-arched logging cart, a high-arched chassis portion, provided with spaced-apart vertical side walls, each wall having a part of its material cut away, defining a downwardly-facing arc, a curved wall joining said side walls at said arc, and T-iron upper and end walls joining said side walls; a tongue extending from said arcuate portion and secured to one of said walls; means carried by said tongue to hoist a log toward said arc into contact with the arcuate portions of said walls; means providing an abutment for said log, adjacent an end thereof, carried by said tongue; and wheels for said chassis.

7. In a timber cart, a chassis including a pair of spaced-apart tongues and an arched log abutment bridging said tongues, comprising a section of channel iron extending transversely of said chassis, having end portions extending over the upper faces of said tongues and downwardly over the outer faces of said tongues, an arched section below said first named section, disposed transversely of said chassis, with the end portions thereof in contact with said tongues and means securing said end portions to said tongues.

HERBERT I. LEWIS.